(12) United States Patent
Burridge-Oakland

(10) Patent No.: US 10,317,895 B2
(45) Date of Patent: Jun. 11, 2019

(54) METHOD AND SYSTEM FOR CONDITION MONITORING

(71) Applicant: Uniper Technologies Limited, Nottingham (GB)

(72) Inventor: Ty Burridge-Oakland, Nottingham (GB)

(73) Assignee: Uniper Technologies Limited, Nottingham (GB)

( * ) Notice: Subject to any disclaimer, the term of this patent is extended or adjusted under 35 U.S.C. 154(b) by 89 days.

(21) Appl. No.: 14/900,674

(22) PCT Filed: Jul. 24, 2014

(86) PCT No.: PCT/GB2014/052274
§ 371 (c)(1),
(2) Date: Dec. 22, 2015

(87) PCT Pub. No.: WO2015/011486
PCT Pub. Date: Jan. 29, 2015

(65) Prior Publication Data
US 2016/0147221 A1 May 26, 2016

(30) Foreign Application Priority Data
Jul. 24, 2013 (GB) .................................. 1313205.5

(51) Int. Cl.
*G05B 23/02* (2006.01)
(52) U.S. Cl.
CPC ............................... *G05B 23/0235* (2013.01)

(58) Field of Classification Search
CPC ............ G05B 23/0235; G05B 23/0229; G05B 23/024; G05B 19/41875; G05B 23/0281;
(Continued)

(56) References Cited

U.S. PATENT DOCUMENTS 6,865,509 B1 * 3/2005 Hsiung .................. G05B 15/02
700/95
7,043,403 B1 5/2006 Wang et al.
(Continued)

OTHER PUBLICATIONS

International Search Report PCT/ISA/210 for International Application No. PCT/GB2014/052274 dated Oct. 20, 2014.
(Continued)

*Primary Examiner* — Dzung Tran
(74) *Attorney, Agent, or Firm* — Harness, Dickey & Pierce, P.L.C.

(57) ABSTRACT

The method may include providing a plurality of historical data vectors, each historical data vector including a value for each of a plurality of empirical variables associated with an apparatus or process. The method may include providing a current data vector including a current value for each of the plurality of empirical variables. The method may include determining a plurality of distance values, each distance value being determined from the current data vector and a different one of the historical data vectors and identifying a minimum distance value from the determined plurality of distance values. The method may include using the identified minimum distance value to determine a condition of the apparatus or process.

31 Claims, 3 Drawing Sheets

(58) Field of Classification Search
CPC .... G05B 23/0264; G06K 9/622; G01N 33/18; G06F 17/30067; G06Q 10/06
USPC .............................. 702/60, 182, 185, 188, 34
See application file for complete search history.

(56) References Cited

U.S. PATENT DOCUMENTS

| | | | |
|---|---|---|---|
| 7,100,081 | B1 | 8/2006 | Purdy et al. |
| 7,383,238 | B1 | 6/2008 | Iverson |
| 8,375,073 | B1* | 2/2013 | Jain .................. G06F 17/30864 707/729 |
| 2004/0158432 | A1 | 8/2004 | King et al. |
| 2005/0169186 | A1* | 8/2005 | Qiu ..................... H04L 41/0631 370/242 |
| 2005/0204028 | A1* | 9/2005 | Bahl ................... H04L 41/0873 709/223 |
| 2005/0209767 | A1 | 9/2005 | Kim et al. |
| 2006/0095232 | A1* | 5/2006 | Purdy ................ G05B 23/0221 702/185 |
| 2008/0183425 | A1* | 7/2008 | Hines ..................... G06F 11/30 702/182 |
| 2009/0193936 | A1 | 8/2009 | Lu et al. |
| 2009/0271150 | A1 | 10/2009 | Stluka et al. |
| 2010/0030521 | A1 | 2/2010 | Akhrarov et al. |
| 2012/0016824 | A1 | 1/2012 | Kalinkin et al. |
| 2012/0317444 | A1 | 12/2012 | Suzuki et al. |
| 2013/0097128 | A1 | 4/2013 | Suzuki et al. |

OTHER PUBLICATIONS

Written Opinion of the International Searching Authority PCT/ISA/237 for International Application No. PCT/GB2014/052274 dated Oct. 20, 2014.
Search Report for corresponding Great Britain Application No. GB1313205.5 dated Feb. 7, 2014.
Search Report for corresponding Great Britain Application No. GB1413165.0 dated Dec. 16, 2014.

* cited by examiner

METHOD AND SYSTEM FOR CONDITION MONITORING

CROSS-REFERENCE TO RELATED APPLICATIONS

This is a National Phase of PCT Patent Application No. PCT/GB2014/052274, filed on Jul. 24, 2014, and claims priority to, Great Britain Application No. 1313205.5, filed Jul. 24, 2013, the contents of each of which are hereby incorporated by reference in their entirety.

FIELD

The present invention relates to a conditioning monitoring method and apparatus for use in monitoring the condition of an apparatus or process and, in particular though not exclusively, for monitoring the condition of an apparatus or process for the generation of power.

BACKGROUND

It is known to monitor the condition of an apparatus or process for the purposes of reducing or minimising the risk of failure of the apparatus or process and/or to optimise the performance of the monitored apparatus or process. Known conditioning monitoring methods generally involve the repeated measurement of one or more variables associated with the monitored apparatus or process and/or an environment surrounding the monitored apparatus or process over a period of time. The one or more measured variables may vary in response to a change in a condition of the monitored apparatus or process. Additionally or alternatively, the one or more measured variables may vary in response to a change in one or more environmental variables. For example, the one or more measured variables may vary in response to a change in the ambient temperature and/or pressure. Known condition monitoring methods may be used to identify a change in a condition of the monitored apparatus or process even in the presence of a change in one or more environmental variables. Such known condition monitoring methods generally rely on the calculation of a vector of predicted or estimated variable values and a comparison of the predicted variable values with current variable values to identify a change in a condition of the monitored apparatus or process. However, calculating such predicted variable values may be complex and may be difficult to implement. In addition, the method of calculating the predicted vector may not be appropriate for some applications. For example, the method of calculating the predicted vector may be too slow, too inaccurate and or may lack sufficient reliability for some applications.

US2008/0183425 discloses an apparatus and method for monitoring the condition of a power plant in which a non-parametric empirical model is constructed from historical sensor readings to predict or estimate current sensor readings. The predicted sensor readings are compared with current sensor readings to identify changes in the state of the power plant. More specifically, a plurality of memory vectors is provided, wherein each memory vector comprises a set of historical readings taken from a plurality of sensors at a different instant in time. A query vector is provided comprising a current reading from each sensor. A distance between the query vector and each of the memory vectors is determined and a weight is evaluated for each memory vector according to the proximity of the query vector to the memory vector. The weights are subsequently used to determine a vector of predicted sensor readings based on a locally weighted regression. The vector of predicted sensor readings and the query vector are compared to identify changes in the condition of the power plant.

SUMMARY

According to a first aspect of the present invention there is provided a method for use in monitoring a condition of an apparatus or a process.

The method may comprise providing a plurality of historical data vectors, each historical data vector comprising a value for each of a plurality of empirical variables associated with the apparatus or the process.

The method may comprise providing a current data vector comprising a current value for each of the plurality of empirical variables.

The method may comprise determining a plurality of distance values, each distance value being determined from the current data vector and a different one of the historical data vectors.

Each distance value may be representative of the magnitude of a vector representative of the differences between the plurality of empirical variable values of a given historical data vector and the corresponding empirical variable values of the current data vector.

The method may comprise identifying a minimum distance value from the determined plurality of distance values.

The method may comprise identifying a closest historical data vector as the historical data vector which corresponds to the minimum determined distance value.

The method may comprise determining a vector of residual values from the current data vector and the closest historical data vector.

The method may comprise determining a vector of residual values according to a difference between the current data vector and the closest historical data vector.

The method may comprise comparing a residual value against a residual range.

The method may comprise determining a condition of the apparatus or process according to a result of the comparison between a residual value and the corresponding residual range.

The method may comprise comparing each residual value against a corresponding residual range.

The method may comprise determining a condition of the apparatus or process according to the result of the comparisons between each residual value and the corresponding residual range.

The method may comprise selecting the residual range so as to correspond to normal, acceptable, safe and/or optimum operation of the apparatus or process.

The method may comprise determining the residual range from measurements performed on the apparatus or process during normal, acceptable, safe and/or optimum operation of the apparatus or process. Such a method does not predict or estimate current empirical variable values using one or more historical empirical variable values. The method is simple and may be easily implemented for providing for efficient, accurate and robust condition monitoring of an apparatus or process.

The method may comprise identifying a change in a condition of the apparatus or process according to a result of the comparison between a residual value and the corresponding residual range.

The method may comprise identifying a change in a condition of the apparatus or process according to whether a residual value lies outside a corresponding residual range.

The method may comprise comparing each of the residual values of the vector of residual values to the corresponding residual range.

The method may comprise identifying a change in the monitored condition of the apparatus or process according to a result of the comparison between all of the residual values and the corresponding residual ranges.

The apparatus may be distributed. For example, the apparatus may be distributed around an environment, building, site or the like.

The apparatus may comprise an industrial plant or an industrial line.

The apparatus may be localised.

The apparatus may comprise machinery, equipment and/or the like.

The apparatus may be configured for power generation,

The process may comprise an industrial process.

The process may comprise a process for the manufacture of a product, a commodity and/or the like.

The process may comprise a process for the generation of power such as the generation of electricity.

The method may comprise measuring the plurality of empirical variables.

The method may comprise measuring the plurality of empirical variables using a plurality of sensors.

The method may comprise sampling a sensor signal to provide a value of an empirical variable.

The method may comprise repeatedly sampling a sensor signal to provide a value of an empirical variable for each historical data vector and/or the current data vector.

The method may comprise repeatedly sampling a plurality of sensor signals to provide the values of the plurality of empirical variables for each historical data vector and/or the current data vector.

The method may comprise interpolating sampled sensor signal values to provide a value of an empirical variable.

The method may comprise interpolating sampled sensor signal values to provide a plurality of values of an empirical variable.

The method may comprise interpolating a plurality of sensor signal values to provide the values of the plurality of empirical variables for each historical data vector and/or the current data vector.

The method may comprise deriving an empirical variable value from one or more measured variable values using a known relationship between the empirical variable value and the one or more measured variable values. For example, the method may comprise deriving one or more flow rates of a fluid flowing through a conduit of known dimensions from one or more measured fluid pressure values and the dimensions of the fluid conduit.

The method may comprise selecting the plurality of historical data vectors such that each different historical data vector corresponds to a different region of operation of the apparatus or the process.

The method may comprise selecting the plurality of historical data vectors such that the plurality of historical data vectors corresponds to or is representative of every different region of operation of the apparatus or the process.

The plurality of empirical variables may define a multi-dimensional parameter space. Selecting the plurality of historical data vectors such that the plurality of historical data vectors corresponds to or is representative of every different region of operation of the apparatus or the process may comprise selecting the plurality of historical data vectors such that the plurality of historical data vectors corresponds to or is representative of every different region of operation of the apparatus or the process in the multi-dimensional parameter space.

The method may comprise providing a plurality of historical data vectors, wherein each historical data vector corresponds to a different instant in time and a given historical data vector comprises a value for each of a plurality of empirical variables associated with the apparatus or the process at a given instant in time.

The method may comprise a selection step of selecting one of the provided plurality of historical data vectors corresponding to a given instant in time according to a region of operation of the apparatus or process at the given instant in time. The method may comprise repeating the selection step so as to provide a plurality of historical data vectors, wherein at least two of the selected historical data vectors correspond to different regions of operation of the apparatus or the process.

The method may comprise repeating the selection step so as to provide a plurality of historical data vectors which correspond to or are representative of every region of operation of the apparatus or the process within the multi-dimensional parameter space.

The different regions of operation of the apparatus or process may include a region of operation in which the apparatus or process is non-operational, non-productive, disabled and/or switched-off.

The different regions of operation of the apparatus or process may constitute a basis set of regions of operation for the apparatus or process.

The method may comprise discarding or excluding historical data vectors which include one or more non-physical, abnormal, uncharacteristically high and/or uncharacteristically low empirical variable values.

The method may comprise discarding or excluding a historical data vector which includes an empirical variable value which exceeds an upper threshold value such as a maximum error value of the empirical variable.

The method may comprise discarding or excluding a historical data vector which includes an empirical variable value which falls below a lower threshold value such as a minimum error value of the empirical variable.

The method may comprise using a distance function to determine the distance value for each historical data vector.

The method may comprise using a Euclidean or $L^2$-norm distance function.

The method may comprise using a $L^1$-norm distance function.

The method may comprise raising an alarm when a residual value lies outside a corresponding residual range. For example, the method may comprise raising an audio alarm and/or a visual alarm to alert a user or an operator of the apparatus or process. This may allow the operator of the apparatus or process to perform one or more actions according to the identified change in the condition of the apparatus or process.

The method may comprise recording an alarm when a residual value lies outside a corresponding residual range.

The method may comprise raising an alarm when a residual value remains outside a corresponding residual range for the duration of an alert period.

The method may comprise recording an alarm when a residual value remains outside a corresponding residual range for the duration of an alert period. For example, the method may comprise logging an alarm to a database when a residual value remains outside a corresponding residual range for the duration of an alert period. The method may comprise permanently logging an alarm to a database when a residual value remains outside a corresponding residual range for the duration of an alert period. The method may comprise generating a viewable representation of any alarms logged to the database.

The method may comprise comparing a residual value to a corresponding positive residual alarm limit. The method may comprise identifying a change in the monitored condition of the apparatus or process according to whether a residual value exceeds a corresponding positive residual alarm limit.

The method may comprise comparing a determined residual value to a corresponding negative residual alarm limit. The method may comprise identifying a change in the monitored condition of the apparatus or process according to whether a residual value falls below a corresponding negative residual alarm limit.

In some circumstances, it may be desirable or necessary to distinguish between residual values which are too great and residual values which are too small because it may be necessary to take different actions depending on whether a residual value is too great or too small. For example, if a residual value corresponding to a temperature of a power plant exceeds a positive residual alarm limit, this may be indicative of a requirement for more cooling to avoid over-heating of the power plant. Conversely, if a residual value corresponding to a temperature of a power plant falls below a negative residual alarm limit, this may be indicative of a requirement for heating, for example heating of a coolant fluid to avoid freezing of a coolant fluid supplied to the power plant.

The method may comprise a historical data scaling step which comprises:
  selecting a value of a given empirical variable from each historical data vector; and
  scaling each of the selected empirical variable values by a scaling constant.

The method may comprise repeating the historical data scaling step for each empirical variable to thereby provide a plurality of scaled historical data vectors.

The method may comprise a current data scaling step comprising:
  selecting a value of an empirical variable from the current data vector; and
  scaling the selected empirical variable value by the same scaling constant used to scale the values of the same empirical variable of each historical data vector.

The method may comprise repeating the current data scaling step for each empirical variable to thereby provide a scaled current data vector.

The method may comprise determining the scaling constant for the given empirical variable to be the inverse of a normalisation constant for the given empirical variable.

The method may comprise selecting the normalisation constant for the given empirical variable according to observed variations in the given empirical variable.

The method may comprise selecting the normalisation constant so as to be representative of a magnitude of observed variations in the given empirical variable.

The method may comprise selecting the normalisation constant according to a function of at least one of a maximum variation, a minimum variation, a mean variation, a median variation and a mode variation in the given empirical variable. The method may comprise selecting the normalisation constant so as to be equal to or proportional to at least one of a maximum variation, a minimum variation, a mean variation, a median variation and a mode variation in the given empirical variable.

The method may comprise selecting the normalisation constant according to a property of a sensor used to measure the given empirical variable.

The method may comprise selecting the normalisation constant according to a property of a sensor used to measure a signal from which a value of the given empirical variable is derived.

The method may comprise determining the distance value for each historical data vector from the corresponding scaled historical data vector and the scaled current data vector.

The method may comprise using a distance function to determine the distance value for each historical data vector from the corresponding scaled historical data vector and the scaled current data vector.

The method may comprise using a Euclidean or $L^2$-norm distance function.

The method ay comprise using a $L^1$-norm distance function. The method may comprise identifying the closest historical data vector as the scaled historical data vector which corresponds to the minimum determined distance value.

The method may comprise determining a vector of residual values from the scaled current data vector and the closest historical data vector.

The method may comprise determining a vector of residual values according to a difference between the scaled current data vector and the closest historical data vector.

The method may comprise a residual value de-scaling step comprising:
  dividing a residual value by the corresponding scaling constant used to scale the corresponding empirical variable values of the historical and current data vectors to thereby determine a de-scaled residual value.

The method may comprise repeating the residual value de-scaling step for each of he residual values to thereby provide a vector of de-scaled residual values.

The method may comprise comparing a de-scaled residual value against an unsealed residual range.

The method may comprise comparing each de-scaled residual value against a corresponding unsealed residual range.

The method may comprise selecting the unsealed residual range so as to correspond to normal, acceptable, safe and/or optimum operation of the apparatus or process.

The method may comprise determining the unsealed residual range from measurements performed on the apparatus or process during normal, acceptable, safe and/or optimum operation of the apparatus or process.

The method may comprise determining a condition of the apparatus or process according to a result of the comparison between a de-scaled residual value and the corresponding unsealed residual range.

The method may comprise identifying a change in a condition of the apparatus or process according to a result of the comparison between a de-scaled residual value and the corresponding unsealed residual range.

The method may comprise identifying a change in a condition of the apparatus or process according to whether a de-scaled residual value lies outside a corresponding unsealed residual range.

The method may comprise comparing each of the de-scaled residual values of the vector of de-scaled residual values to the corresponding unsealed residual range.

The method may comprise identifying a change in the monitored condition of the apparatus or process according to a result of the comparison between all of the de-scaled residual values and the corresponding unscaled residual ranges.

The method may comprise raising an alarm when a de-scaled residual value lies outside a corresponding unscaled residual range. For example, the method may comprise raising an audio alarm and/or a visual alarm to alert a user or an operator of the apparatus or process. This may allow the operator of the apparatus or process to perform one or more actions according to the identified change in the condition of the apparatus or process.

The method may comprise recording an alarm when a de-scaled residual value lies outside a corresponding unscaled residual range.

The method may comprise raising an alarm when a de-scaled residual value remains outside a corresponding unscaled residual range for the duration of an alert period.

The method may comprise recording an alarm when a de-scaled residual value remains outside a corresponding unscaled residual range for the duration of an alert period. For example, the method may comprise logging an alarm to a database when a de-scaled residual value remains outside a corresponding unscaled residual range for the duration of an alert period. The method may comprise permanently logging an alarm to a database when a de-scaled residual value remains outside a corresponding unscaled residual range for the duration of an alert period. The method may comprise generating a viewable representation of any alarms logged to the database.

The method may comprise comparing a de-scaled residual value to a corresponding positive unscaled residual alarm limit. The method may comprise identifying a change in the monitored condition of the apparatus or process according to whether a de-scaled residual value exceeds a corresponding positive unscaled residual alarm limit.

The method may comprise comparing a determined de-scaled residual value to a corresponding negative unscaled residual alarm limit. The method may comprise identifying a change in the monitored condition of the apparatus or process according to whether a de-scaled residual value falls below a corresponding negative unscaled residual alarm limit.

In some circumstances, it may be desirable or necessary to distinguish between de-scaled residual values which are too great and de-scaled residual values which are too small because it may be necessary to take different actions depending on whether a de-scaled residual value is too great or too small. For example, if a de-scaled residual value corresponding to a temperature of a power plant exceeds a positive unscaled residual alarm limit, this may be indicative of a requirement for more cooling to avoid over-heating of the power plant. Conversely, if a de-scaled residual value corresponding to a temperature of a power plant falls below a negative unscaled residual alarm limit, this may be indicative of a requirement for heating, for example heating of a coolant fluid to avoid freezing of a coolant fluid supplied to the power plant.

The method may comprise performing one or more actions or steps according to the identified change in the condition of the apparatus or process.

The method may comprise performing remedial work, for example, repairing a fault or replacing one or more worn-out parts according to the identified change in the condition of the apparatus or process.

The method may comprise scheduling preventative maintenance operations according to the identified change in the condition of the apparatus or process.

The method may comprise interrupting or shutting-down the operation of the apparatus according to the identified change in the condition of the apparatus.

The method may comprise interrupting or shutting-down a process according to the identified change in the condition of the process.

The method may comprise adjusting or modifying the apparatus or process according to the identified change in the condition of the apparatus or process. The method may comprise re-setting or reconfiguring the apparatus or process according to the identified change in the condition of the apparatus or process. Such a method may be used to improve or optimise one or more performance parameters of the apparatus or process such as an operating efficiency, yield or the like.

The method may comprise determining a scaled residual range by scaling an unscaled residual range by the same scaling constant used to scale the values of the corresponding empirical variable from the historical and current data vectors.

The method may comprise comparing a residual value to a corresponding scaled residual range.

The method may comprise determining a condition of the apparatus or process according to a result of the comparison between a residual value and the corresponding scaled residual range.

The method may comprise identifying a change in a condition of the apparatus or process according to a result of the comparison between a residual value and the corresponding scaled residual range.

The method may comprise identifying a change in a condition of the apparatus or process according to whether a residual value lies outside a corresponding scaled residual range.

The method may comprise comparing all of the residual values to the corresponding scaled residual ranges.

The method may comprise identifying a change in the monitored condition according to a result of the comparison between all of the residual values and the corresponding scaled residual ranges.

According to a second aspect of the present invention there is provided a monitoring apparatus for use in monitoring a condition of a monitored apparatus or process.

The monitoring apparatus may be configured to receive a plurality of historical data vectors, each historical data vector comprising a value for each of a plurality of empirical variables associated with the apparatus or the process.

The monitoring apparatus may be configured to receive a current data vector comprising a current value for each of the plurality of empirical variables.

The monitoring apparatus may be configured to determine a plurality of distance values, each distance value being determined from the current data vector and a different one of the historical data vectors.

The monitoring apparatus may be configured to identify the minimum determined distance value from the determined plurality of distance values.

Each distance value may be representative of the magnitude of the vector representative of the differences between a plurality of empirical variable values of a given historical data vector and the corresponding empirical variable values of the current data vector.

The monitoring apparatus may be configured to use the identified minimum distance value to determine a condition of the apparatus or process.

The monitored apparatus may be distributed. For example, the monitored apparatus may be distributed around an environment, building, site or the like.

The monitored apparatus may comprise an industrial plant or an industrial line.

The monitored apparatus may be localised.

The monitored apparatus may comprise machinery, equipment and/or the like.

The monitored apparatus may be configured for power generation.

The monitored process may comprise an industrial process for the manufacture of a product, a commodity and/or the like.

The monitored process may comprise an industrial process.

The monitored process may comprise a process for the generation of power such as the generation of electricity.

The monitoring apparatus may comprise a processor which is configured, for example programmed, to receive the plurality of historical data vectors.

The processor may be configured, for example programmed, to receive the current data vector.

The processor may be configured, for example programmed, to determine the plurality of distance values.

The processor may be configured, for example programmed, to identify the minimum determined distance value from the plurality of determined distance values.

The processor may be configured to determine a distance value from the Current data vector and each of the historical data vectors.

The processor may be located in close proximity to or remotely from a location of the monitored apparatus or the process.

The monitoring apparatus may comprise a memory configured for communication with the processor.

The memory may be configured to store the plurality of historical data vectors.

The processor may be configured to receive the plurality of historical data vectors from the memory.

The processor may be configured to determine a distance value for each historical data vector, wherein the distance value for a given historical data vector is representative of the magnitude of the vector representative of the differences between all of the empirical variable values of the given historical data vector and all of he corresponding empirical variable values of the current data vector.

The monitoring apparatus may comprise a sensor configured to measure an empirical variable.

The monitoring apparatus may comprise a plurality of sensors, each sensor configured to measure one of the empirical variables.

Each sensor may be configured for communication with the processor and/or the memory.

Each sensor may be configured for wireless and/or wireline communication with the processor and/or the memory.

The monitoring apparatus may comprise an analogue to digital (A/D) converter.

The analogue to digital (A/D) converter may be configured for communication with a sensor, for example wireless and/or wireline communication with a sensor.

The analogue to digital (A/D) converter may be configured to sample a sensor signal to provide a value of an empirical variable.

The A/D converter may be configured to repeatedly sample a sensor signal to provide a value of an empirical variable for each historical data vector and/or the current data vector.

The analogue to digital (A/D) converter may be configured for communication with a plurality of sensors, for example wireless and/or wireline communication with the plurality of sensors.

The A/D converter may be configured to repeatedly sample a plurality of sensor signals to provide the values of the plurality of empirical variables for each historical data vector and/or the current data vector.

The A/D converter may be configured for communication with the processor and/or the memory.

The processor may be configured to receive sampled sensor signal values from the A/D converter and/or the memory.

The processor may be configured to interpolate sampled sensor signal values to provide a value of an empirical variable.

The processor may be configured to interpolate a plurality of sampled sensor signal values to provide the values of the plurality of empirical variables for each historical data vector and/or the current data vector.

It should be understood that one or more of the optional features associated with the first aspect may apply alone or in any combination in connection with the second aspect.

According to a third aspect of the present invention there is provided a self-monitoring system comprising a monitoring apparatus and a monitored apparatus.

The monitoring apparatus may be configured to receive a plurality of historical data vectors, each historical data vector comprising a value for each of a plurality of empirical variables associated with the monitored apparatus.

The monitoring apparatus may be configured to receive a current data vector comprising a current value for each of the plurality of empirical variables.

The monitoring apparatus may be configured to determine a plurality of distance values, each distance value being determined from the current data vector and a different one of the historical data vectors.

The monitoring apparatus may be configured to identify the minimum determined distance value from the plurality of determined distance values.

The monitoring apparatus may be configured to use the identified minimum distance value to determine a condition of the monitored apparatus.

It should be understood that one or more of the optional features associated with the first or second aspects may apply alone or in any combination in connection with the third aspect.

BRIEF DESCRIPTION OF THE DRAWINGS

The present invention will now be described by way of non-limiting example only with reference to the accompanying drawings of which.

DETAILED DESCRIPTION OF THE DRAWINGS

Figure 1:
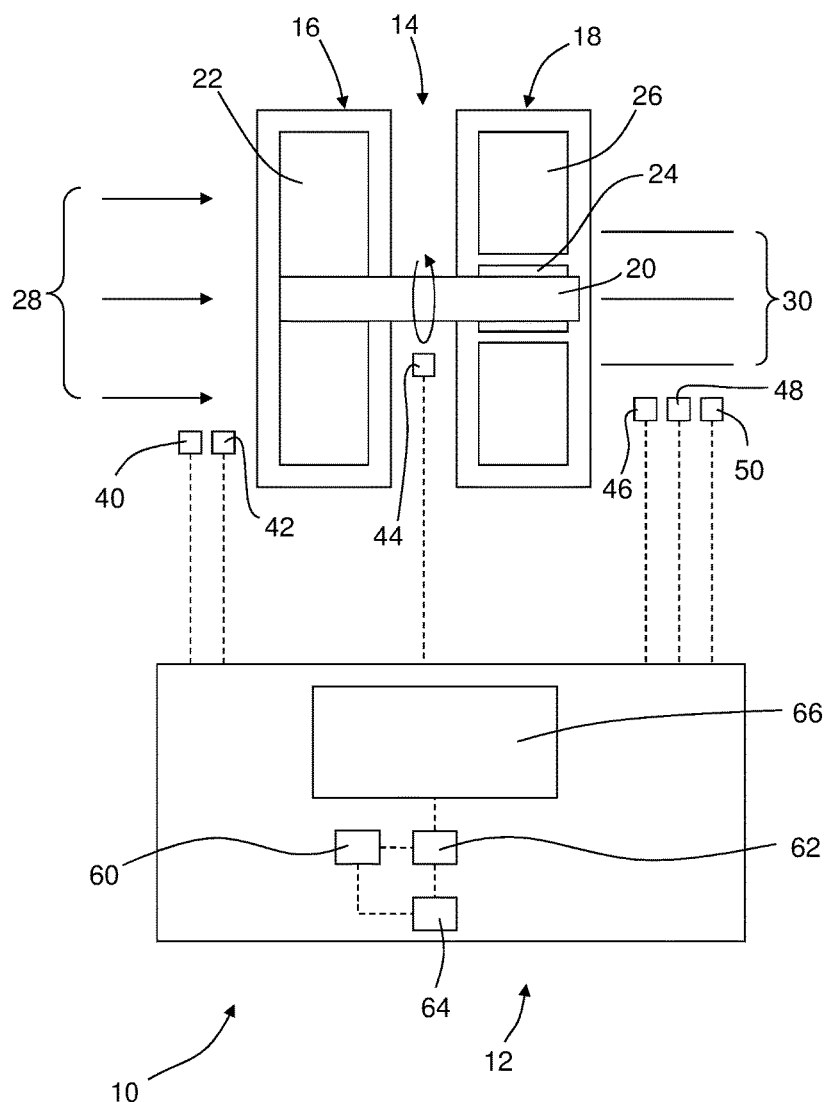
FIG. 1 schematically shows a self-monitoring system comprising a monitored apparatus in the form of a turbine generator and a condition monitoring system.

Referring initially to FIG. 1 there is shown a self-monitoring system generally designated 10 which includes a condition monitoring apparatus generally designated 12 and a monitored apparatus in the form of a turbine generator generally designated 14. The turbine generator 14 includes a turbine 16 and a generator 18. The turbine 16 and the generator 18 are mechanically coupled together by a rotatable shaft 20. The turbine 16 comprises turbine blades 22 attached to the shaft 20. The generator 18 includes a rotor 24 attached to the shaft 20. The generator 18 further includes a stator 26. In use, the turbine 16 receives a fluid such as steam 28 which drives the shaft 20 via the turbine blades 22. Consequently, the rotor 24 also rotates and the stator 26 generates a three-phase electrical supply 30.

The condition monitoring apparatus 12 includes a temperature sensor 40, a pressure sensor 42, a shaft rotational speed sensor 44, and line-to-line voltage sensors 46, 48 and 50. As such, the condition monitoring apparatus 12 shown in FIG. 1 is configured to monitor six empirical variables, namely temperature, pressure, shaft rotational speed and three different line-to-line voltages. It should be understood, however, that the condition monitoring apparatus 12 may, in general, monitor more or fewer than six empirical variables. Furthermore, the condition monitoring apparatus 12 may monitor empirical variables other than temperature, pressure, rotational speed of the shaft 20 and line-to-line voltage. For example, the condition monitoring apparatus 12 may monitor vibration of one or more parts of the turbine 16 and/or the generator 18.

The condition monitoring apparatus 12 further includes an A/D converter 60, a processor 62, a memory 64, and a display 66. The processor 62 is configured for communication with the A/D converter 60, the memory 64 and the display 66. In use, the A/D converter 60 repeatedly samples signals received from the sensors 40, 42, 44, 46, 48, 50 and stores the sampled values of the empirical variables in the memory 64 as historical data. As will be explained in more detail below, the A/D converter 60 subsequently samples signals received from the sensors 40, 42, 44, 46, 48, 50 and provides the sampled values of the empirical variables to the processor 62 for comparison with the historical data from the memory 64.

Figure 2:
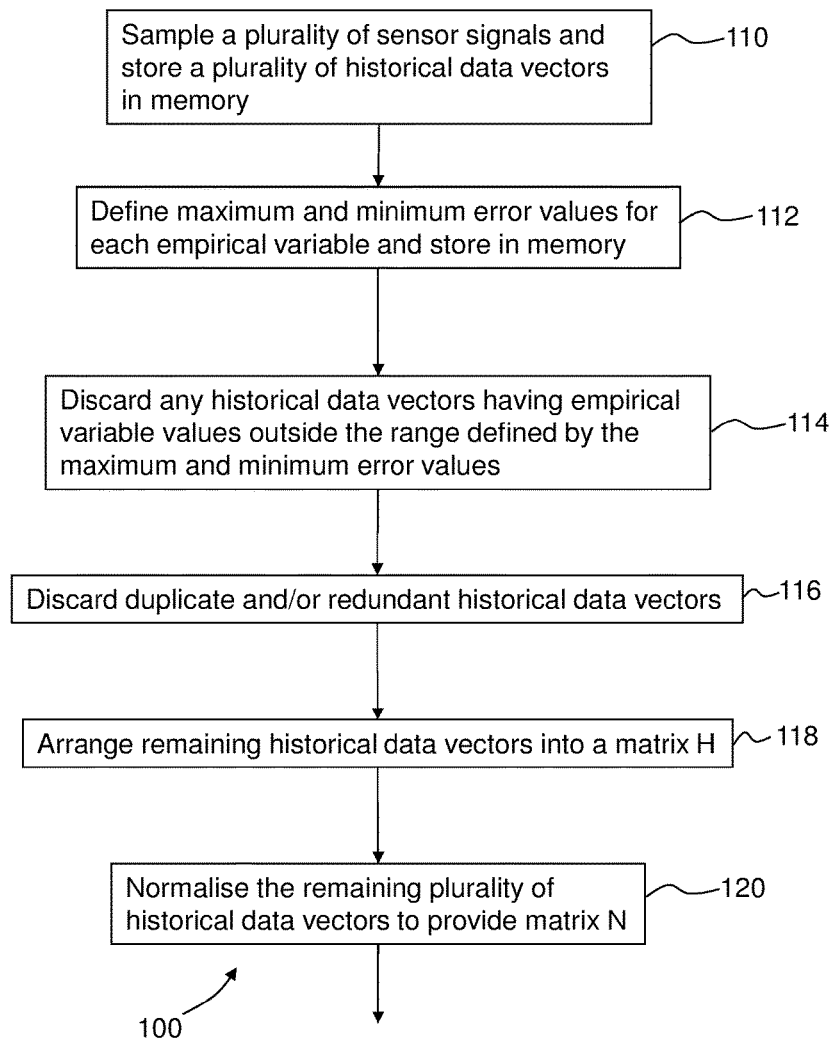
FIG. 2 schematically illustrates a first part of a method for use in condition monitoring.

FIG. 2 illustrates a first part of a method generally designated 100 for use in monitoring the condition of the turbine generator 14. At step 110, a signal from each of the sensors 40, 42, 44, 46, 48, 50 is repeatedly sampled by the A/D converter 60 during operation of the turbine generator 14 over an extended period of time and the resulting empirical variable values are stored as a plurality of historical data vectors or snapshots in the memory 64. Each historical data vector includes a value for each of the six empirical variables associated with the turbine generator 14 at a given instant in time.

At step 112, maximum and minimum error values for each of the six empirical variables are defined and stored in the memory 64 so as to delimit a physical, valid or characteristic range for the corresponding empirical variable.

At step 114, the processor 62 receives the stored plurality of historical data vectors from the memory 64 and discards any historical data vectors having invalid, unphysical or uncharacteristic empirical variable values which lie outside the corresponding range defined by the corresponding maximum and minimum error values. Step 114 may serve to exclude any historical data vectors having empirical variable values sensed using a faulty, failed or inaccurate sensor.

At step 116, duplicate and/or redundant historical data vectors are discarded so that the historical data vectors remaining in the memory 64 form a basis set of historical data vectors which correspond to or are representative of every different region of operation of the turbine generator 14. Typically, the memory 64 retains 10,000-20,000 historical data vectors or snapshots representing every different region of operation of the turbine generator 14.

At step 118 the remaining historical data vectors are arranged into a historical data matrix H having six rows and J columns, wherein each row corresponding to sampled data values from a different one of the six sensors 40, 42, 44, 46, 48, 50 and the $j^{th}$ column represents the $j^{th}$ snapshots:

$$\begin{bmatrix} H_{11} & H_{12} & \cdots & H_{1J} \\ H_{21} & H_{22} & \cdots & \cdots \\ \cdots & \cdots & H_{ij} & \cdots \\ H_{61} & \cdots & \cdots & H_{6J} \end{bmatrix} \quad \text{Equation 1}$$

Thus, the $j^{th}$ column of the historical data matrix H represents a snapshot at instant j and comprises six sensor readings measured at instant j. At step 120, each of the historical empirical variable values H are normalised to create a normalised historical data matrix N:

$$\begin{bmatrix} H_{11} & H_{12} & \cdots & H_{1J} \\ H_{21} & H_{22} & \cdots & \cdots \\ \cdots & \cdots & H_{ij} & \cdots \\ H_{61} & \cdots & \cdots & H_{6J} \end{bmatrix} \xrightarrow{Normalisation} \begin{bmatrix} N_{11} & N_{12} & \cdots & N_{1J} \\ N_{21} & N_{22} & \cdots & \cdots \\ \cdots & \cdots & N_{ij} & \cdots \\ N_{61} & \cdots & \cdots & N_{6J} \end{bmatrix} \quad \text{Equation 2}$$

where $N_{ij}=H_{ij}/r_i$ and $r_i$ is a normalisation constant or radius associated with the $i^{th}$ sensor. The normalisation constant $r_i$ for the $i^{th}$ sensor may be selected according to observed historical variations in the value of the empirical variable sensed by the $i^{th}$ sensor. The normalisation constant $r_i$ may be selected so as to be representative of a magnitude of observed variations in the empirical variable sensed by the $i^{th}$ sensor. The normalisation constant $r_i$, may be selected according to a function of at least one of a maximum variation, a minimum variation, a mean variation, a median variation and a mode variation in the empirical variable sensed by the sensor. The normalisation constant $r_i$, may be selected so as to be equal to or proportional to at least one of a maximum variation, a minimum variation, a mean variation, a median variation and a mode variation in the in the empirical variable sensed by the $i^{th}$ sensor.

Figure 3:
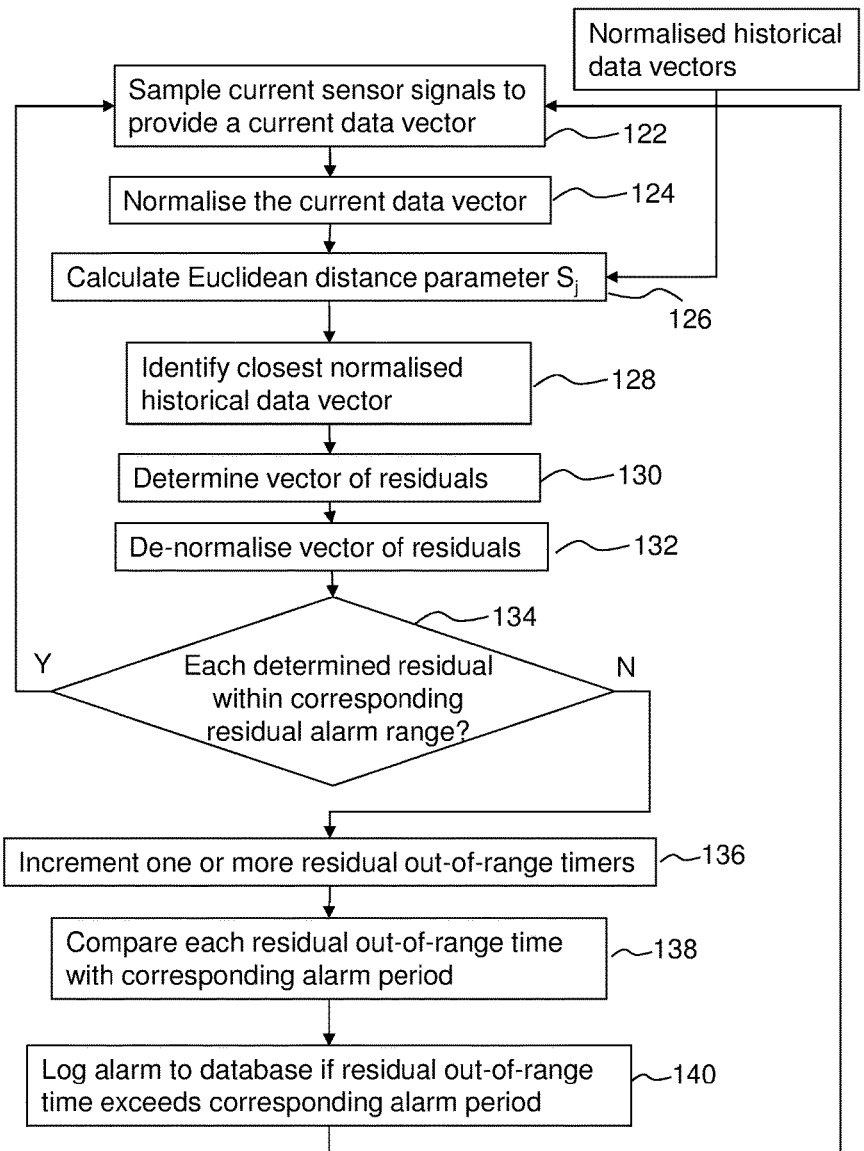
FIG. 3 schematically illustrates a second part of the method for use in condition monitoring.

FIG. 3 illustrates a second part of the method 100 for use in monitoring the condition of the turbine generator 14. At step 122, a signal from each of the six sensors 40, 42, 44, 46, 48, 50 is sampled by the A/D converter 60 to provide a current data vector or snapshot R including a current value for each of the six empirical variables associated with the turbine generator 14:

$$\begin{bmatrix} R_1 \\ R_2 \\ \cdots \\ R_6 \end{bmatrix} \quad \text{Equation 3}$$

At step 124, each of the current empirical variable values $R_i$ is normalised using the same normalisation constant or radius $r_i$ used to normalise the empirical variable values of the historical data matrix H to thereby create a normalised current data vector X:

$$\begin{bmatrix} R_1 \\ R_2 \\ ... \\ R_6 \end{bmatrix} \xrightarrow{Normalisation} \begin{bmatrix} X_1 \\ X_2 \\ ... \\ X_6 \end{bmatrix} \quad \text{Equation 4}$$

where $X_i = R/r_i$.

At step 126, a Euclidean distance parameter $S_j$ is determined according to the following Euclidean distance equation:

$$S_j^2 = (X_1 - N_{1j})^2 + (X_2 - N_{2j})^2 + \ldots + (X_6 - N_{6j})^2 \quad \text{Equation 5}$$

A closest normalised historic data vector is identified at step 128 as that normalised historic data vector which minimises the Euclidean distance parameter $S_j$ defined by Equation 5.

At step 130, a vector of difference or residual values is determined according to:

$$\begin{bmatrix} X_1 - N_{1jmin} \\ X_2 - N_{2jmin} \\ ... \\ X_6 - N_{6jmin} \end{bmatrix} \quad \text{Equation 6}$$

where $j_{min}$ represents the index corresponding to the closest normalised historic data vector.

Each residual value $X_i - N_{1jmin}$ is then de-normalised at step 132 by multiplying the residual value $X_i - N_{ijmin}$ by the corresponding radius $r_i$.

Each de-normalised residual value is compared to corresponding positive and negative un-normalised residual alarm limits which define normal, acceptable, safe and/or optimum operation of the turbine generator 14 at step 134. If the de-normalised residual value is greater than the corresponding positive un-normalised residual alarm limit or the de-normalised residual value is less than the corresponding negative un-normalised residual alarm limit, this indicates that the turbine generator 14 is operating outside of its normal, acceptable, safe and/or optimum operating range.

If it is determined that one or more residuals are out-of-range, one or more corresponding out-of-range timers are incremented at step 136 as appropriate. The residual out-of-range time is compared with a corresponding alarm period at step 138. If the residual out-of-range time exceeds a corresponding alarm period, an alarm, flag, warning message or the like is logged permanently to a database at step 140 which is viewable by a user of the condition monitoring apparatus 12 on display 66.

One skilled in the art will appreciate that modifications of the condition monitoring apparatus 12 and methods described above may be possible. For example, rather than de-normalising the vector of residuals at step 132 and then comparing the de-normalised vector of residuals with a vector of un-normalised residual alarm ranges at step 134, the vector of un-normalised residual alarm ranges may be normalised and compared with the vector of residuals.

The invention claimed is:

1. A method for use in monitoring a condition of an apparatus comprising at least one of an industrial plant, an industrial line, machinery, equipment, a power plant, an apparatus configured for power generation, a turbine or a generator, or for use in monitoring a condition of a process comprising at least one of an industrial process, a process for manufacture of a product, a process for manufacture of a commodity, a process for generation of power or a process for generation of electricity, the method comprising:

using a plurality of sensors to measure a plurality of empirical variables associated with the apparatus or process and thereby provide a plurality of historical data vectors, each historical data vector of the plurality of historical data vectors comprising a scalar value for each empirical variable of the plurality of empirical variables;

using the plurality of sensors to measure the plurality of empirical variables associated with the apparatus or process and thereby provide a current data vector comprising a current scalar value for each empirical variable of the plurality of empirical variables;

determining a plurality of scalar distance values, each scalar distance value of the plurality of scalar distance values being determined from the current data vector and a different one of the plurality of historical data vectors;

identifying a minimum one of the determined plurality of scalar distance values;

identifying a historical data vector among the plurality of historical data vectors corresponding to the minimum one of the determined plurality of scalar distance values as a closest historical data vector;

determining a vector of scalar residual values from the current data vector and the closest historical data vector, wherein each scalar residual value among the vector of scalar residual values is determined by subtraction of a current scalar value of the current data vector corresponding to a particular empirical variable among the plurality of empirical variables and a scalar value of the closest historical data vector which corresponds to the particular empirical variable;

comparing each respective scalar residual values of the vector of scalar residual values to a corresponding scalar residual range among a plurality of scalar residual ranges;

raising or recording a corresponding alarm when the respective scalar residual value lies outside the corresponding scalar residual range; and reconfiguring the apparatus or process depending on a result of the comparing.

2. The method according to claim 1, comprising sampling a sensor signal to provide a value of an empirical variable among the plurality of empirical variables.

3. The method according to claim 1, comprising repeatedly sampling a plurality of sensor signals to provide values of the plurality of empirical variables for each historical data vector or the current data vector.

4. The method according to claim 1, comprising deriving a value of specific empirical variable among the plurality of empirical variables from one or more measured variable values using a known relationship between the value of the specific empirical variable and the one or more measured variable values.

5. The method according to claim 1, comprising selecting the plurality of historical data vectors so that each different historical data vector among the plurality of historical data vectors corresponds to a different region of operation of the apparatus or process.

6. The method according to claim 1, comprising selecting the plurality of historical data vectors such that the plurality of historical data vectors corresponds to, or is representative of, every different region of operation of the apparatus or process.

7. The method according to claim 6, wherein the different regions of operation of the apparatus or process include a region of operation in which the apparatus or process is non-operational, non-productive, disabled or switched-off.

8. The method according to claim 1, comprising discarding or excluding historical data vectors among the plurality of historical data vectors which include one or more scalar values that are non-physical, abnormal, uncharacteristically high or uncharacteristically low.

9. The method according to claim 1, comprising using a distance function to determine each scalar distance value from the current data vector and the different one of the historical data vectors.

10. The method according to claim 9, wherein the distance function is a Euclidean distance function, a $L^2$-norm distance function, or a $L^1$-norm distance function.

11. The method according to claim 1, comprising selecting each scalar residual range among the plurality of scalar residual ranges so as to correspond to normal, acceptable, safe or optimum operation of the apparatus or process.

12. The method according to claim 1, wherein the raising or recording raises or records the corresponding alarm when the respective scalar residual value remains outside the corresponding scalar residual range for a duration of an alert period.

13. The method according to claim 1, wherein the corresponding scalar residual range is associated with a positive or negative scalar residual alarm limit.

14. The method according to claim 1, comprising identifying a change in the condition of the apparatus or process according to a result of the comparing.

15. The method according to claim 14, comprising at least one of performing remedial work, repairing a fault, replacing one or more worn-out parts, scheduling preventative maintenance operations, or interrupting or shutting-down the operation of the apparatus or the process, depending on the identified change in the condition of the apparatus or process.

16. The method according to claim 1, comprising a historical data scaling step which comprises:
    selecting first empirical variable among the plurality of empirical variables; and
    scaling each of a first plurality of scalar values for the first empirical variable by a scaling constant, each of the plurality of historical data vectors including one of the first plurality of scalar values.

17. The method according to claim 16, comprising determining the scaling constant to be an inverse of a normalisation constant for the first empirical variable.

18. The method according to claim 17, comprising selecting the normalisation constant for the first empirical variable according to observed variations in the first empirical variable.

19. The method according to claim 17, comprising selecting the normalisation constant for the first empirical variable according to a function of at least one of a maximum variation, a minimum variation, a mean variation, a median variation or a mode variation of the first empirical variable.

20. The method according to claim 16, comprising repeating the historical data scaling step for each of the plurality of empirical variables to thereby provide a plurality of scaled historical data vectors.

21. The method according to claim 20, comprising a current data scaling step which comprises:
    selecting a specific current scalar value for specific empirical variable among the plurality of empirical variables from the current data vector; and
    scaling the specific current scalar value for the specific empirical variable selected from the current data vector by the same scaling constant used to perform the historical data scaling step for the specific empirical variable.

22. The method according to claim 21, comprising repeating the current data scaling step for each current scalar value of the current data vector to thereby provide a scaled current data vector.

23. The method according to claim 22, wherein the determining the plurality of scalar distance values determines the plurality of scalar distance values from the plurality of scaled historical data vectors and the scaled current data vector.

24. The method according to claim 23, wherein the identifying the historical data vector includes identifying a scaled historical data vector among the plurality of scaled historical data vectors corresponding to the minimum one of the determined plurality of scalar distance values as the closest historical data vector.

25. The method according to claim 24, wherein the determining the vector of scalar residual values determines the vector of scalar residual values according to a difference between the scaled current data vector and the closest historical data vector.

26. The method according to claim 25, comprising a residual value de-scaling step comprising dividing a particular scalar residual value among the vector of scalar residual values corresponding to a respective empirical variable among the plurality of empirical variables by a corresponding scaling constant used to perform the historical data scaling step for the respective empirical variable to thereby determine a de-scaled scalar residual value.

27. The method according to claim 26, comprising:
    repeating the residual value de-scaling step for each scalar residual value among the vector of scalar residual values to thereby provide a vector of de-scaled scalar residual values,
    wherein the comparing compares each respective de-scaled scalar residual value among the vector of de-scaled scalar residual values to a corresponding unsealed scalar residual range among a plurality of unsealed scalar residual ranges.

28. The method according to claim 25, comprising:
    determining a scaled scalar residual range for each respective empirical variable among the plurality of empirical variables by scaling an unsealed scalar residual range for the respective empirical variable by the same scaling constant used to perform the historical data scaling step for the respective empirical variable to thereby provide a plurality of scaled scalar residual ranges; and
    identifying a change in the monitored condition of the apparatus or process according to a result of the comparing,
    wherein the comparing compares each respective scalar residual value of the vector of scalar residual values to a corresponding scaled scalar residual range among the plurality of scaled scalar residual ranges.

29. A monitoring apparatus for use in monitoring a condition of a monitored apparatus or process, the monitored apparatus comprising at least one of an industrial plant, an industrial line, machinery, equipment, a power plant, an apparatus configured for power generation, a turbine or a generator, and the monitored process comprising at least one of an industrial process, a process for manufacture of a product, a process for manufacture of a commodity, a process for generation of power or a process for generation of electricity, and the monitoring apparatus comprising:

a plurality of sensors for measuring a plurality of empirical variables associated with the monitored apparatus or process to thereby provide a plurality of historical data vectors, each historical data vector of the plurality of historical data vectors comprising a scalar value for each empirical variable of the plurality of empirical variables, and to thereby provide a current data vector comprising a current scalar value for each empirical variable of the plurality of empirical variables;

at least one processor; and a memory, wherein the memory stores instructions which, when executed by the at least one processor, cause the monitoring apparatus to, determine a plurality of scalar distance values, each scalar distance value of the plurality of scalar distance values being determined from the current data vector and a different one of the plurality of historical data vectors, identify a minimum one of the determined plurality of scalar distance values, identify a historical data vector among the plurality of historical data vectors corresponding to the minimum one of the determined plurality of scalar distance values as a closest historical data vector, determine a vector of scalar residual values from the current data vector and the closest historical data vector, wherein each scalar residual value among the vector of scalar residual values is determined by subtraction of a current scalar value of the current data vector corresponding to a particular empirical variable among the plurality of empirical variables and a scalar value of the closest historical data vector which corresponds to the particular empirical variable, compare each respective scalar residual values of the vector of scalar residual values to a corresponding scalar residual range among a plurality of scalar residual ranges, raise or record a corresponding alarm when the respective scalar residual value lies outside the corresponding scalar residual range, and reconfigure the monitored apparatus or process depending on a result of the comparison.

30. The method according to claim 1, comprising determining a condition of the apparatus or process according to a result of the comparing.

31. The method according to claim 1, comprising at least one of:

performing remedial work;

repairing a fault;

replacing one or more worn-out parts;

scheduling preventative maintenance operations; or interrupting or shutting-down the operation of the apparatus or the process, depending on a result of the comparing.

* * * * *